United States Patent
Bengtsson et al.

(10) Patent No.: US 11,518,226 B2
(45) Date of Patent: Dec. 6, 2022

(54) LOCKING AND UNLOCKING FIXTURE CAPABLE OF ADAPTIVE POSITION ADJUSTMENT

(71) Applicant: NIO CO., LTD., Shanghai (CN)

(72) Inventors: Jan Bengtsson, Shanghai (CN); Nan Li, Shanghai (CN); Xikun Ding, Shanghai (CN); Xiaotao Tian, Shanghai (CN)

(73) Assignee: NIO CO., LTD., Shanghai (CN)

( * ) Notice: Subject to any disclaimer, the term of this patent is extended or adjusted under 35 U.S.C. 154(b) by 734 days.

(21) Appl. No.: 16/475,889

(22) PCT Filed: Jan. 4, 2018

(86) PCT No.: PCT/CN2018/071396
§ 371 (c)(1),
(2) Date: Jul. 3, 2019

(87) PCT Pub. No.: WO2018/127098
PCT Pub. Date: Jul. 12, 2018

(65) Prior Publication Data
US 2019/0344651 A1    Nov. 14, 2019

(30) Foreign Application Priority Data

Jan. 4, 2017  (CN) .......................... 201720006535.9

(51) Int. Cl.
*B60K 1/00*    (2006.01)
*B60K 1/04*    (2019.01)
*B60L 53/80*   (2019.01)

(52) U.S. Cl.
CPC ................ *B60K 1/04* (2013.01); *B60L 53/80* (2019.02); *B60K 2001/0455* (2013.01)

(58) Field of Classification Search
CPC .......................... B60K 1/04; B60K 2001/0455
See application file for complete search history.

(56) References Cited

U.S. PATENT DOCUMENTS 3,583,715 A * 6/1971 Jahrl .................... B23B 31/1071
                                                         279/82
4,535,863 A * 8/1985 Becker .................. H01M 50/20
                                                         180/68.5
(Continued)

FOREIGN PATENT DOCUMENTS

CN    102815190    12/2012
CN    104724080    6/2015
(Continued)

OTHER PUBLICATIONS

International Search Report for International (PCT) Patent Application No. PCT/CN2018/071396, dated Mar. 7, 2018, 3 pages.

*Primary Examiner* — Hau V Phan
(74) *Attorney, Agent, or Firm* — Sheridan Ross P.C.

(57) ABSTRACT

The invention belongs to the field of new energy vehicles, and particularly provides a locking and unlocking fixture capable of adaptive position adjustment. The invention aims to solve the problems of existing automated unlocking apparatuses for traction batteries having high requirements for machining precision, and the resulting machining difficulties. The locking and unlocking fixture of the invention comprises: a fixture sleeve, a base sheathed inside the fixture sleeve, and a first spring provided between the fixture sleeve and the base, wherein a clearance fit is formed between the fixture sleeve and the base, and the fixture sleeve can move vertically relative to the base, such that the fixture sleeve can match a locking device of the power battery even if there is a certain positioning error when the fixture sleeve is engaged with the locking device, and the fixture sleeve can return to an initial position under the action of the first spring when the fixture sleeve is disengaged from the locking device of the power battery. As a result, it is not necessary for the locking and unlocking fixture of the invention to provide (Continued)

high-precision machining and installation to enable an automated unlocking apparatus to successfully unlock the power battery.

20 Claims, 6 Drawing Sheets

(56) References Cited

U.S. PATENT DOCUMENTS

| | | | | |
|---|---|---|---|---|
| 4,637,234 | A | * | 1/1987 | Mielonen .............. E05B 67/365 |
| | | | | 70/462 |
| 6,997,724 | B2 | * | 2/2006 | Earl ..................... H01R 11/284 |
| | | | | 439/133 |
| 7,104,002 | B2 | * | 9/2006 | Rotundo ................. F41C 23/14 |
| | | | | 42/71.01 |
| 7,782,626 | B2 | * | 8/2010 | Buck ................... H01M 50/202 |
| | | | | 361/801 |
| 10,300,149 | B2 | * | 5/2019 | Iversen .................. A61K 47/64 |
| 10,457,130 | B2 | * | 10/2019 | Bengtsson ............. B60L 53/80 |
| 2012/0210757 | A1 | * | 8/2012 | Gentile ................. E05B 67/365 |
| | | | | 70/276 |

FOREIGN PATENT DOCUMENTS

| | | |
|---|---|---|
| CN | 205601588 | 9/2016 |
| CN | 106080159 | 11/2016 |
| JP | 2010-188472 | 9/2010 |
| JP | 2010-203574 | 9/2010 |

* cited by examiner

LOCKING AND UNLOCKING FIXTURE CAPABLE OF ADAPTIVE POSITION ADJUSTMENT

CROSS REFERENCE TO RELATED APPLICATIONS

This application is a national stage application under 35 U.S.C. 371 and claims the benefit of PCT Application No. PCT/CN2018/071396, having an international filing date of 4 Jan. 2018, which designated the United States, which PCT application claimed the benefit of China Patent Application No. 201720006535.9 filed 4 Jan. 2017, the disclosure of each of which are incorporated herein by reference.

TECHNICAL FIELD

The invention belongs to the field of new energy vehicles, and particularly provides a locking and unlocking fixture capable of adaptive position adjustment.

BACKGROUND ART

New energy vehicles have become a research hotspot in the automotive industry. The chassis-type battery swap structure has the characteristics of short replacement time and easy automated operation due to the replacement of the entire battery, and therefore has increasingly become a hot technology in the industry research. Due to the heavy weight of the chassis battery swap type power battery, multiple locking points are required to lock and unlock same. In general, an automated unlocking apparatus is used to unlock multiple locking mechanisms at the same time, which presents a great challenge to the adaptability of the locking and unlocking fixture.

At present, in order to enable an automated unlocking apparatus to unlock multiple locking mechanisms at the same time, the locking and unlocking fixture and a service object thereof often require high machining precision, which inevitably increases the production cost.

Accordingly, there is a need in the art for a new locking and unlocking fixture for a power battery to solve the above problems.

SUMMARY OF THE INVENTION

In order to solve the above problems in the prior art, i.e., to solve the problems of existing automated unlocking apparatuses for traction batteries having high requirements for machining precision, and the resulting machining difficulties, the invention provides a locking and unlocking fixture capable of adaptive position adjustment, which is mainly used for locking and unlocking a power battery installed to an electric vehicle. The locking and unlocking fixture comprises: a fixture sleeve; and a base, which is received in the fixture sleeve, and is further connected to a driving device, wherein the fixture sleeve is floatable within a set range relative to the base during a process in which the driving device drives the base to approach the power battery.

In a preferred technical solution of the locking and unlocking fixture described above, the base comprises a first columnar segment and a second columnar segment, wherein the second columnar segment is a prismatic segment, which is received in a first sliding segment of the fixture sleeve in a clearance fit manner.

In a preferred technical solution of the locking and unlocking fixture described above, a first spring is sheathed over the fixture sleeve corresponding to the first sliding segment, the first spring is further connected to the first columnar segment, and in the case where an external force is removed, the first spring enables the fixture sleeve to return to an initial position of the fixture sleeve relative to the base.

In a preferred technical solution of the locking and unlocking fixture described above, the locking and unlocking fixture further comprises a first limiting mechanism, which enables the fixture sleeve to float in a vertical direction relative to the base as the driving device moves the base in the vertical direction.

In a preferred technical solution of the locking and unlocking fixture described above, the first limiting mechanism comprises: a first strip-shaped hole provided in the prismatic segment; a first radial hole provided in the first sliding segment; and a first connecting rod connected to the first strip-shaped hole and the first radial hole, respectively, wherein the first connecting rod is slidable within a hole length range of the first strip-shaped hole, such that the fixture sleeve is floatable relative to the base within the hole length range of the first strip-shaped hole.

In a preferred technical solution of the locking and unlocking fixture described above, the locking and unlocking fixture further comprises a second limiting mechanism received in a second sliding segment of the fixture sleeve, wherein the second limiting mechanism is capable of jacking up a threaded rod of a locking device of the power battery corresponding to the locking and unlocking fixture during a process in which the driving device moves the base in the vertical direction.

In a preferred technical solution of the locking and unlocking fixture described above, the top of the fixture sleeve is provided with a connecting structure which is able to match and be butt against the threaded rod of the locking device of the power battery.

In a preferred technical solution of the locking and unlocking fixture described above, the second limiting mechanism comprises: a push rod which received in the second sliding segment, and is slidable in an axial direction of the fixture sleeve; a second strip-shaped hole provided in the push rod; a second radial hole provided in the second sliding segment; and a second connecting rod connected to the second strip-shaped hole and the second radial hole, respectively, wherein the second connecting rod is slidable within a hole length range of the second strip-shaped hole, such that the fixture sleeve is floatable relative to the push rod within the hole length range of the second strip-shaped hole.

In a preferred technical solution of the locking and unlocking fixture described above, a second spring is sheathed over the push rod, and in the case where an external force is removed, the second spring enables the push rod to return to an initial position relative to the fixture sleeve.

In a preferred technical solution of the locking and unlocking fixture described above, the second spring is axially provided between the push rod and the second connecting rod, and in the case where an external force is removed, the second connecting rod is able to abut against the end of the second strip-shaped hole that is close to the base.

It will be understood by those skilled in the art that in the preferred technical solutions of the invention, a clearance fit is formed between the fixture sleeve and the base, and the fixture sleeve can slide up and down and float horizontally relative to the base by providing a first spring between the fixture sleeve and the base, such that the fixture sleeve can match the locking device of the power battery even if there is a certain positioning error when the fixture sleeve is engaged with the locking device, and the fixture sleeve can return to an initial position under the action of the first spring when the fixture sleeve is disengaged from the locking device of the power battery. As a result, it is not necessary for the locking and unlocking fixture of the invention to provide high-precision machining and installation to enable an automated unlocking apparatus to successfully unlock the power battery.

LIST OF REFERENCE NUMERALS

Figure 1:
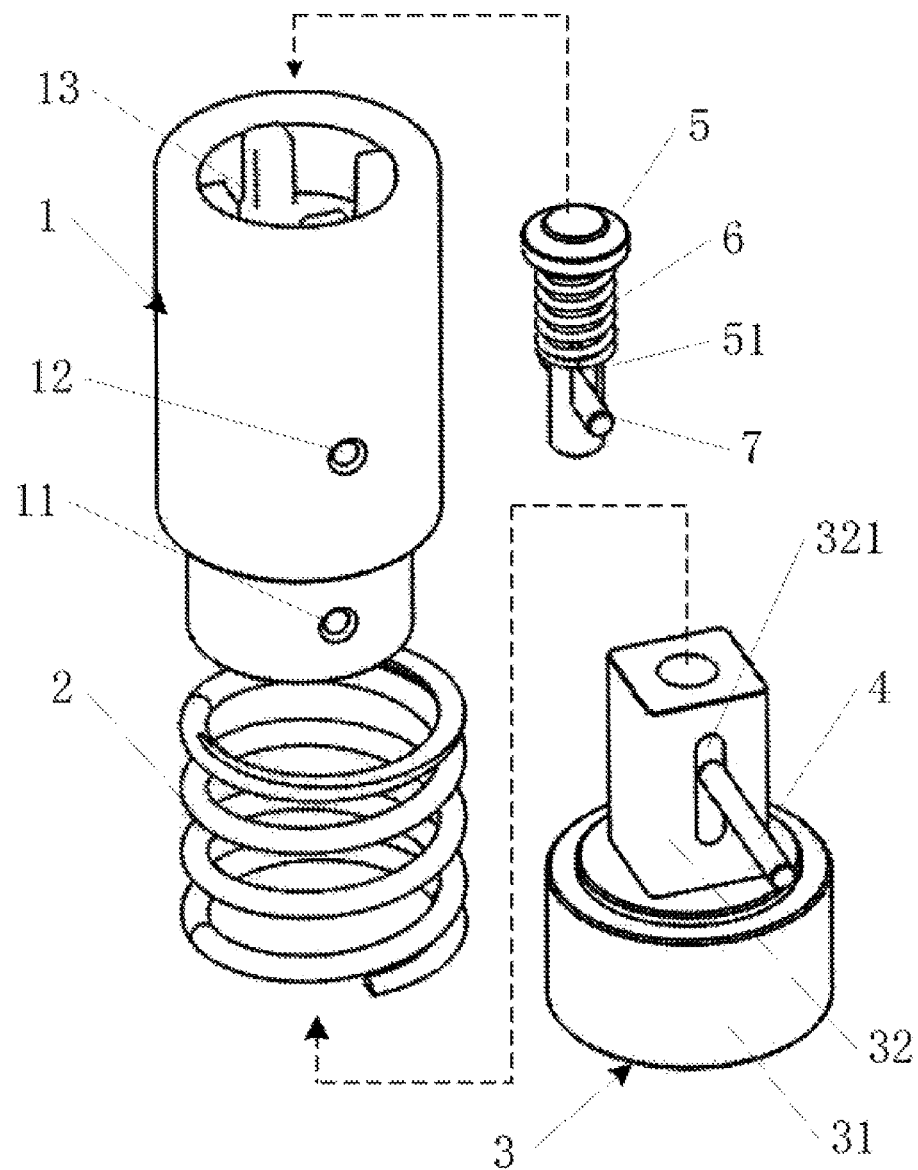
FIG. 1 is a schematic perspective assembling view of a locking and unlocking fixture capable of adaptive position adjustment of the invention.

1. Fixture sleeve; 11. First radial hole; 12. Second radial hole; 13. Connecting structure; 14. Square hole; 15. Circular hole; 2. First spring; 3. Base; 31. Cylindrical segment; 32. Square columnar segment; 321. First strip-shaped hole; 33. Connecting hole; 4. First connecting rod; 5. Push rod; 51. Second strip-shaped hole; 6. Second spring; 7. Second connecting rod; 8. Locking plate; 9. Locking device; 91. Bushing; 92. Third spring; 93. Threaded rod; 931. Flange; 94. Nut; 95. Retaining ring.

DETAILED DESCRIPTION OF EMBODIMENTS

Preferred embodiments of the invention are described below with reference to the accompanying drawings. It should be understood by those skilled in the art that these embodiments are only for explaining the technical principles of the invention and are not intended to limit the scope of protection of the invention. For example, although various components in the drawings are drawn in a certain proportional relationship, such a proportional relationship is not fixed, those skilled in the art can make amendments according to requirements so as to adapt to specific application scenarios.

It should be noted that in the description of the invention, the terms, such as "center", "upper", "lower", "left", "right", "vertical", "horizontal", "inner" and "outer", that indicate directions or positional relationships are based on the directions or positional relationships shown in the drawings only for convenience of description, and do not indicate or imply that the device or element must have a specific orientation, be constructed and operate in a specific orientation, and therefore cannot be understood as limitation to the invention. In addition, the terms "first", "second" and "third" are for descriptive purposes only and should not be construed as indicating or implying relative importance.

In addition, it should also be noted that in the description of the invention, the terms "install", "couple" and "connect" are to be understood in a broad sense, for example, it may be a fixed connection, a detachable connection, or an integral connection; a mechanical connection or an electrical connection; a direct connection or an indirect connection via an intermediate medium, or a communication between the interiors of two elements, unless expressly specified and defined otherwise. For those skilled in the art, the specific meaning of the above terms in the invention can be interpreted according to the specific situation.

The locking and unlocking fixture capable of adaptive position adjustment of the invention is mainly used for locking and unlocking a chassis-type power battery installed on a chassis of the electric vehicle or a battery swap station for the electric vehicle, in particular, for unlocking a power battery which has been fixedly installed, and the locking and unlocking fixture of the invention has significant advantages over the existing locking and unlocking devices. The details are as follows:

As shown in FIG. 1, the locking and unlocking fixture capable of adaptive position adjustment of the invention mainly comprises a fixture sleeve 1, a first spring 2, a base 3 and a spring pusher. The fixture sleeve 1 is provided with a first radial hole 11, a second radial hole 12 and a connecting structure 13. The base 3 comprises a first columnar segment and a second columnar segment, for example, the first columnar segment may be a lower cylindrical segment 31 in FIG. 1, and the second columnar segment may be an upper prismatic segment in FIG. 1 (taking a square columnar (quadrangular prismatic) segment 32 as an example). The square columnar segment 32 is provided with a first strip-shaped hole 321, through which first strip-shaped hole 321 the first connecting rod 4 installed therein can be moved up and down relative to the base 3 in the length direction of the hole. The spring pusher mainly comprises a push rod 5, a second spring 6 and a second connecting rod 7. The push rod 5 is provided with a second strip-shaped hole 51, through which second strip-shaped hole 51 the second connecting rod 7 installed therein can be moved up and down relative to the push rod 5 in the length direction of the hole. Further, the second spring 6 is provided between the push rod 5 and the second connecting rod 7, and the second connecting rod 7 is pushed by the second spring 6 to the lowermost end of the second strip-shaped hole 51 in a normal state.

Figure 2:
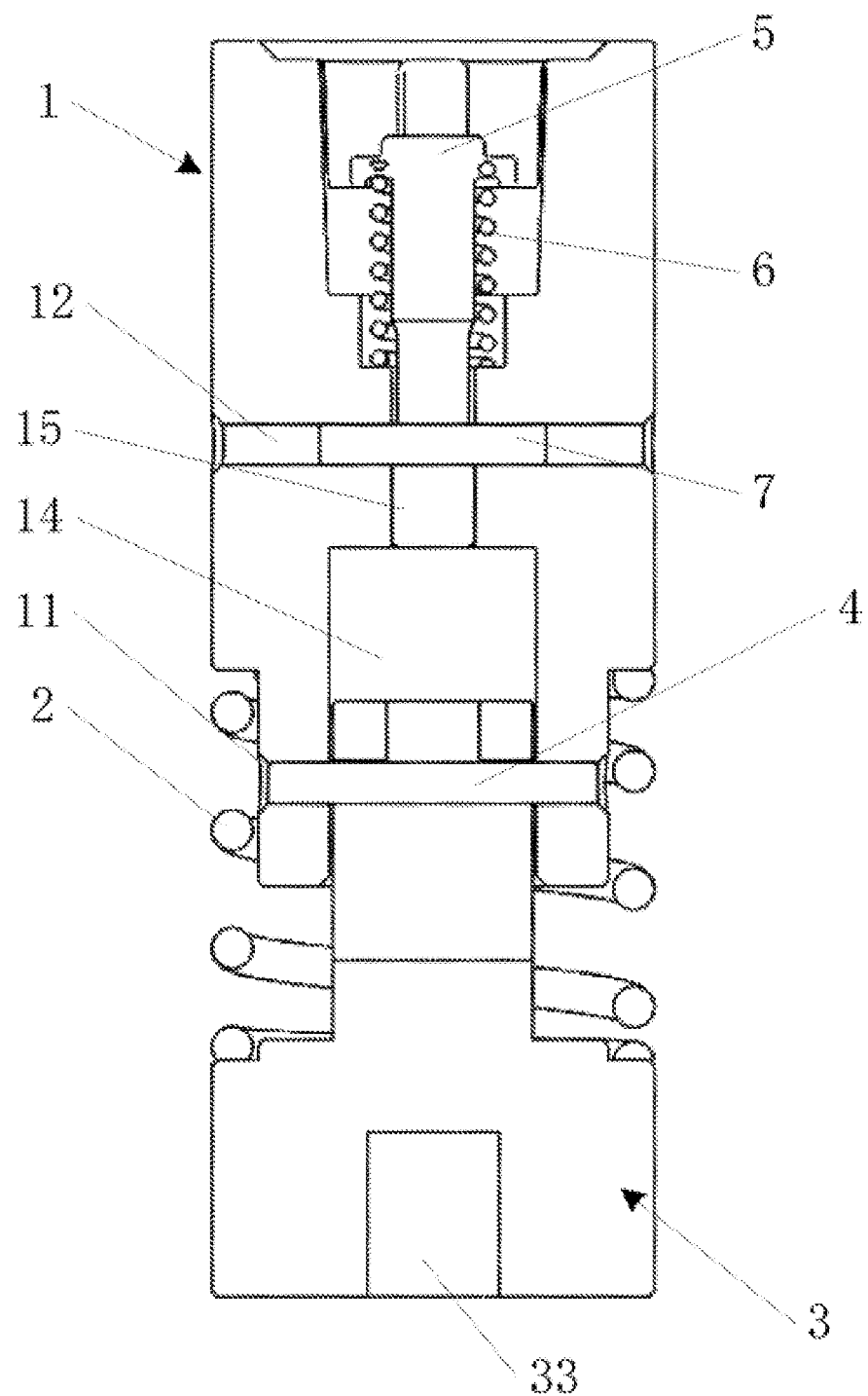
FIG. 2 is a first cross-sectional view of the locking and unlocking fixture capable of adaptive position adjustment of the invention in an assembled state.
Figure 3:
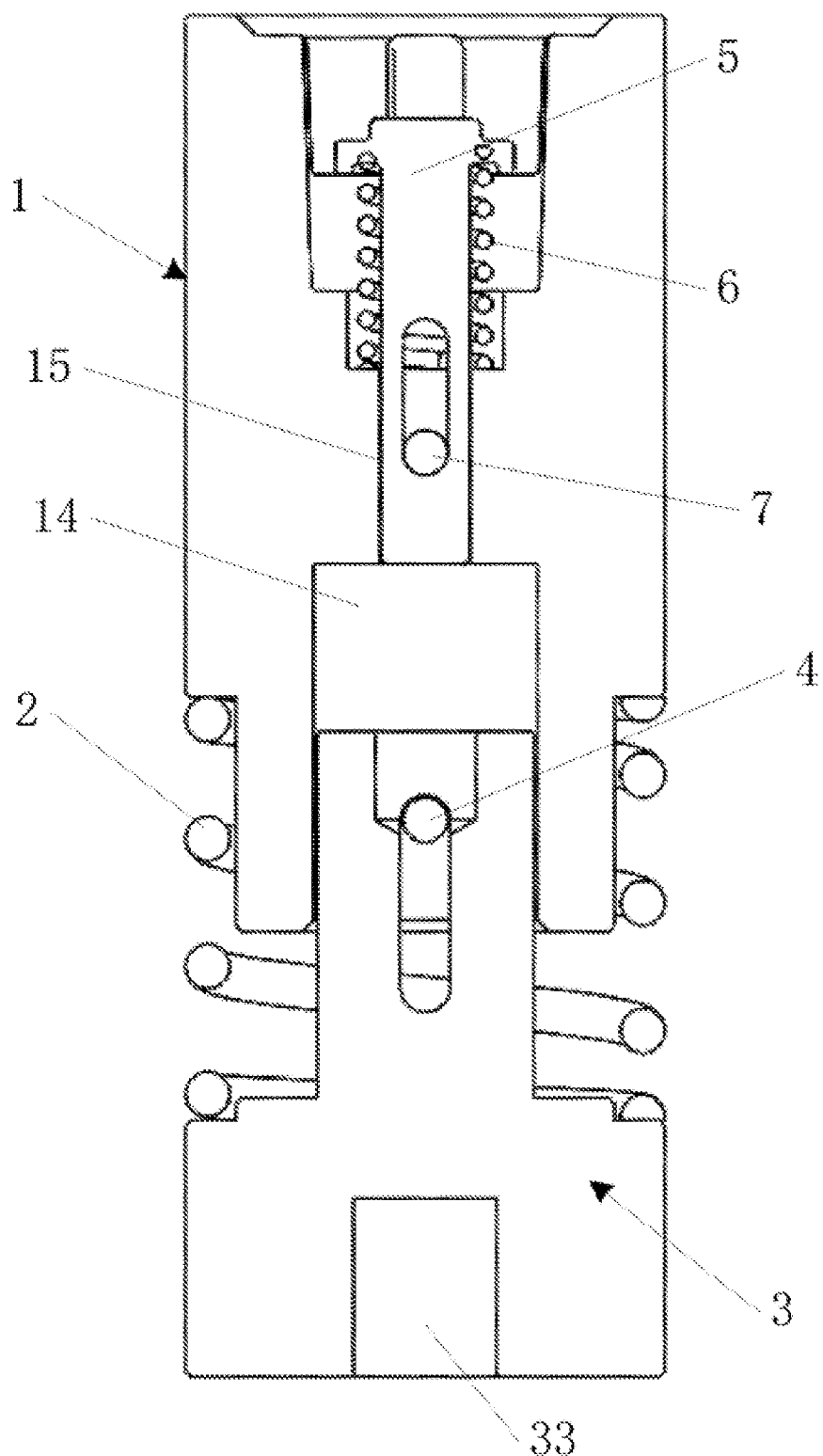
FIG. 3 is a second cross-sectional view of the locking and unlocking fixture capable of adaptive position adjustment of the invention in the assembled state.

As shown in FIGS. 2 and 3, the first connecting rod 4 is also installed into the first radial hole 11, and when the fixture sleeve 1 and the base 3 are connected via the first connecting rod 4, the fixture sleeve 1 can slide up and down relative to the base 3 as the first sliding rod 4 slides in the hole length direction of the first strip-shaped hole 321, the size of the opening of the first strip-shaped hole 321 in the vertical direction can limit the length of the relative sliding distance between the fixture sleeve 1 and the base 3, so that the first radial hole 11, the first strip-shaped hole 321 and the first connecting rod 4 together constitute the first limiting mechanism described in the claims. The fixture sleeve 1 and the base 3 preferably form a clearance fit in the radial direction, in particular, the square columnar segment 32 is sheathed inside the first sliding segment (a square hole 14 shown in FIGS. 2 and 3) on the fixture sleeve 1, and a clearance fit is formed between the two such that the fixture sleeve 1 can float relative to the base 3 within a set range (mainly the floating of the fixture sleeve 1 relative to the base 3 in the horizontal direction), the size of the floating range being mainly determined by the size of the clearance. It will be understood by those skilled in the art that the cross section of the prismatic segment is not strictly polygonal, and may be any other form of non-cylindrical segment other than the prismatic structure in a geometric sense, for example, a D-shaped columnar segment, an elliptical columnar segment, a spline shaft-type columnar segment, etc. It should be noted that, as the shape of the second columnar segment changes, the square hole 14 for accommodating the second columnar segment also needs to be changed correspondingly, so that the base 1 can drive the fixture sleeve 1 to rotate in the assembled state. Further, the first spring 2 is provided between the fixture sleeve 1 and the base 3 in the axial direction of the fixture sleeve 1, the upper end of the first spring 2 abuts against a shoulder (not shown) provided on the fixture sleeve 1, and the lower end of the first spring 2 abuts against an upper surface of the cylindrical segment 31, such that the fixture sleeve 1 can return to its initial position, namely the position in which the fixture sleeve 1 is coaxial or approximately coaxial with the cylindrical segment 31, relative to the base 3 when no external force is applied.

With continued reference to FIGS. 2 and 3, the spring pusher is installed inside a second sliding segment (shown as a circular hole 15 in FIGS. 2 and 3) on the fixture sleeve 1, specifically, the second connecting rod 7 is also installed inside the second radial hole 12, and when the fixture sleeve 1 and the spring pusher are connected via the second connecting rod 7, the fixture sleeve 1 can slide up and down relative to the push rod 5 as the second connecting rod 7 slides in the hole length direction of the second strip-shaped hole 51. The size of the opening of the second strip-shaped hole 51 in the vertical direction can limit the length of the relative sliding distance between the fixture sleeve 1 and the push rod 5, so that the second radial hole 12, the second strip-shaped hole 51 and the second connecting rod 7 together form the second limiting mechanism described in the claims.

Figure 4:
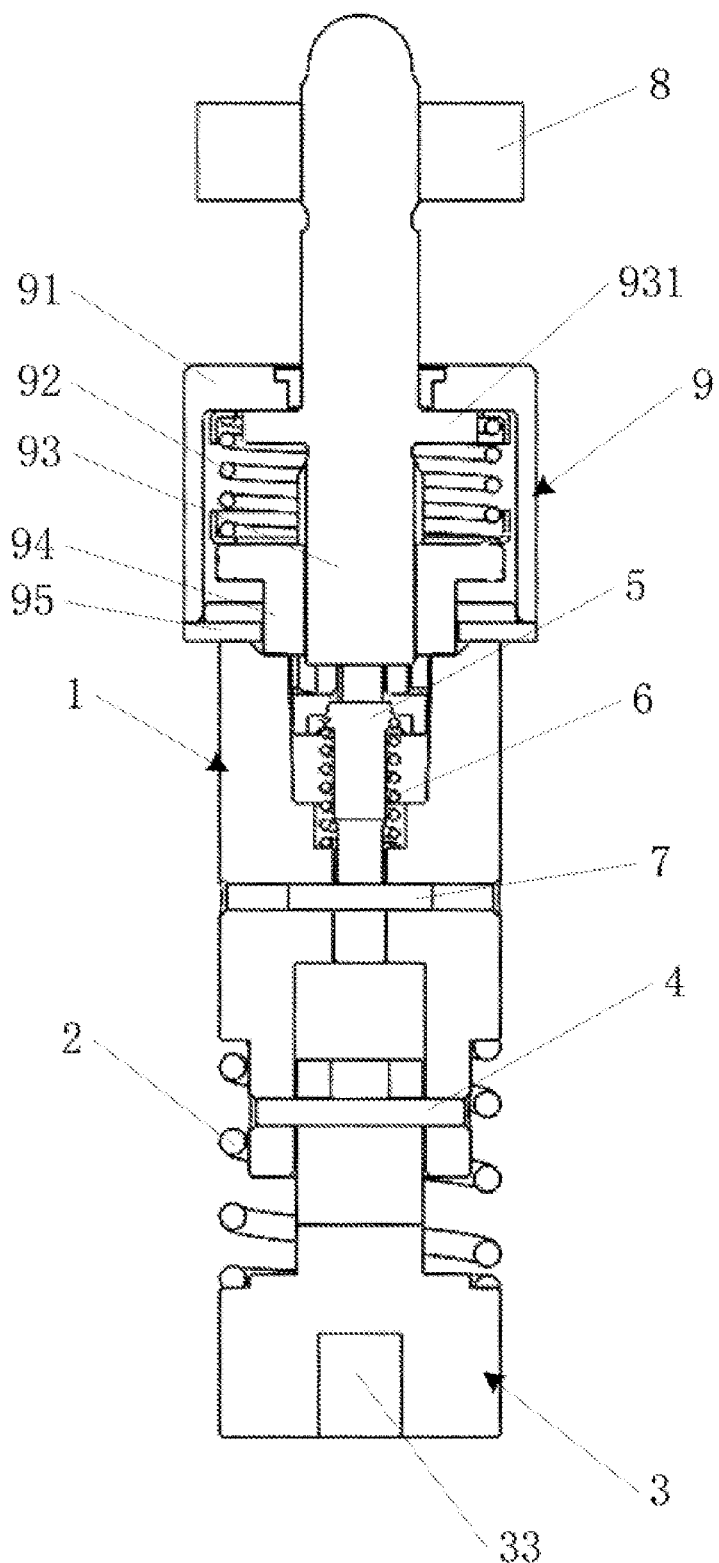
FIG. 4 is a schematic matching view when the locking and unlocking fixture capable of adaptive position adjustment of the invention unlocks a locking device of a power battery.

As shown in FIG. 4, it shows the connection state when the locking and unlocking fixture of the invention unlocks the locking device 9 of the power battery. It should be noted that the locking device 9 mainly comprises: a bushing 91; a third spring 92, a threaded rod 93, and a nut 94, which are provided inside the bushing; and a retaining ring 95 provided at the bottom end of the bushing 91. The bushing 91 is fixedly connected to the power battery, the threaded rod 93 passes through the bushing 91 in the axial direction, the third spring 92 and the nut 94 are both sheathed over the threaded rod 93, and the nut 94 abuts against the upper end of the retaining ring 95 under the action of the third spring 92.

Further, an upper segment of the threaded rod 93 is provided with a thread so that the threaded rod 93 can be connected, via the thread, to a locking plate 8 provided on the electric vehicle or a battery swap station for the electric vehicle; and a lower segment of the threaded rod 93 is provided with an external spline, and the nut 94 engaged with the lower segment of the threaded rod 93 is provided with a spline hole so that the threaded rod 93 and the nut 94 can be engaged via the spline. Still further, the spline engagement between the threaded rod 93 and the nut 94 uses a clearance fit so that the nut 94 can freely slide in the axial direction of the threaded rod 93. It will be understood by those skilled in the art that the length, width and height of the external spline on the threaded rod 93 can be set according to requirements, such as 9-teeth spline, 11-teeth spline and 13-teeth spline, etc. Alternatively, those skilled in the art can also connect the threaded rod 93 and the nut 94 by means of a connection other than the spline, as long as the nut 94 can drive the threaded rod 93 to rotate, and the nut 94 can freely slide in the axial direction of the threaded rod 93.

Yet still further, an outer surface of the nut 94 is provided with a connected structure (not shown) that matches the connecting structure 13 on the fixture sleeve 1. Specifically, the connected structure is a groove, and the connecting structure 13 is a raised structure. Alternatively, those skilled in the art can also make appropriate adjustments according to requirements to enable the nut 94 and the fixture sleeve 1 to be connected by matching the connecting structure 13 with the connected structure. It will be understood by those skilled in the art that the nut 94 and the fixture sleeve 1 form a clearance fit in the radial direction so that the nut 94 and the fixture sleeve 1 can be smoothly connected and disconnected.

It will be understood by those skilled in the art that the locking and unlocking fixture of the invention is installed to a battery swap trolley (or a battery swap apparatus such as a battery swap robot) for the power battery to realize locking and unlocking actions on the power battery. Further, in the specific implementation, it is necessary to provide a locking and unlocking fixture, which corresponds to the locking device 9 of the power battery, on the battery swap trolley.

The working principle of the locking and unlocking fixture of the invention will be briefly described below with reference to FIG. 4.

When the power battery is removed from the electric vehicle or the battery swap station, first, the battery swap trolley will drive to the battery swap position below the power battery. Then, all the locking and unlocking fixtures on the battery swap trolley are lifted at the same time until the connecting structure 13 of the fixture sleeve 1 is sheathed into the nut 94. Finally, the driving device (for example, a servo motor), which is connected to the connecting hole 33 of the base 3, drives the base 3 to rotate, which in turn drives the fixture sleeve 1 to rotate by means of the cooperation between the square hole 14 and the square columnar segment 32, and the nut 94 is further driven to turn the threaded rod 93 until the threaded rod 93 disengages from the locking plate 8.

When the power battery is installed to the electric vehicle or the battery swap station, first, the battery swap trolley will drive to the battery swap position below the power battery. Then, all the locking and unlocking fixtures on the battery swap trolley and the power battery are lifted at the same time until the connecting structure 13 of the fixture sleeve 1 is sheathed into the nut 94. Finally, the driving device, which is connected to the connecting hole 33 of the base 3, drives the base 3 to rotate, which in turn drives the fixture sleeve 1 to rotate by means of the first connecting rod 4, the nut 94 is further driven to turn the threaded rod 93 until the threaded rod 93 and the locking plate 8 are tightened to a pre-set torque, and the driving device stops rotating.

Figure 5:
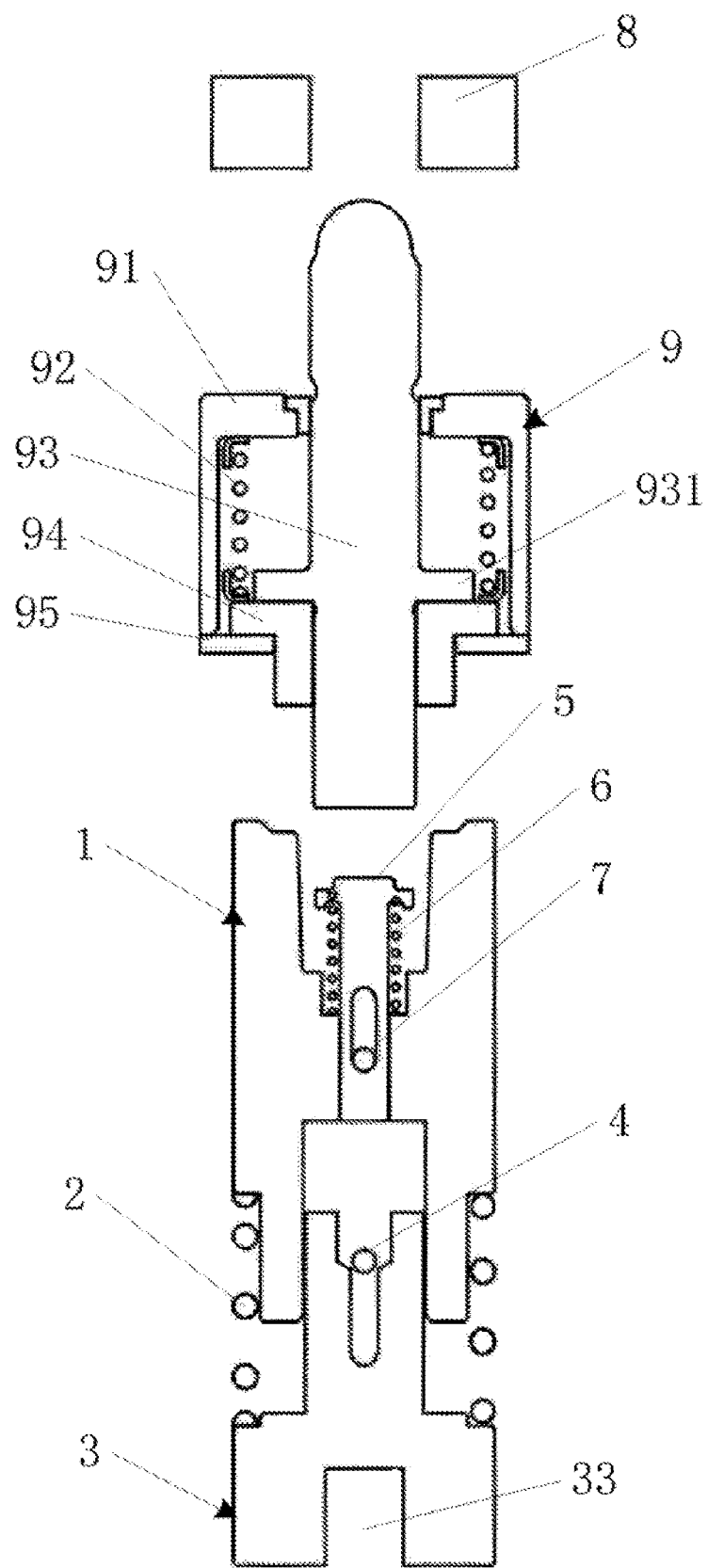
FIG. 5 is a schematic view before the locking and unlocking fixture capable of adaptive position adjustment of the invention locks the locking device of the power battery.

As shown in FIG. 5, when the power battery is not installed to the electric vehicle or the battery swap station, the threaded rod 93 is lowered by its own gravity until the flange 931 thereon abuts against the nut 94, so that the lower end of the threaded rod 93 will extend by a distance beyond the lower end of the nut 94, and the connecting structure 13 in the fixture sleeve 1 thus cannot match and be connected to the nut 94.

Figure 6:
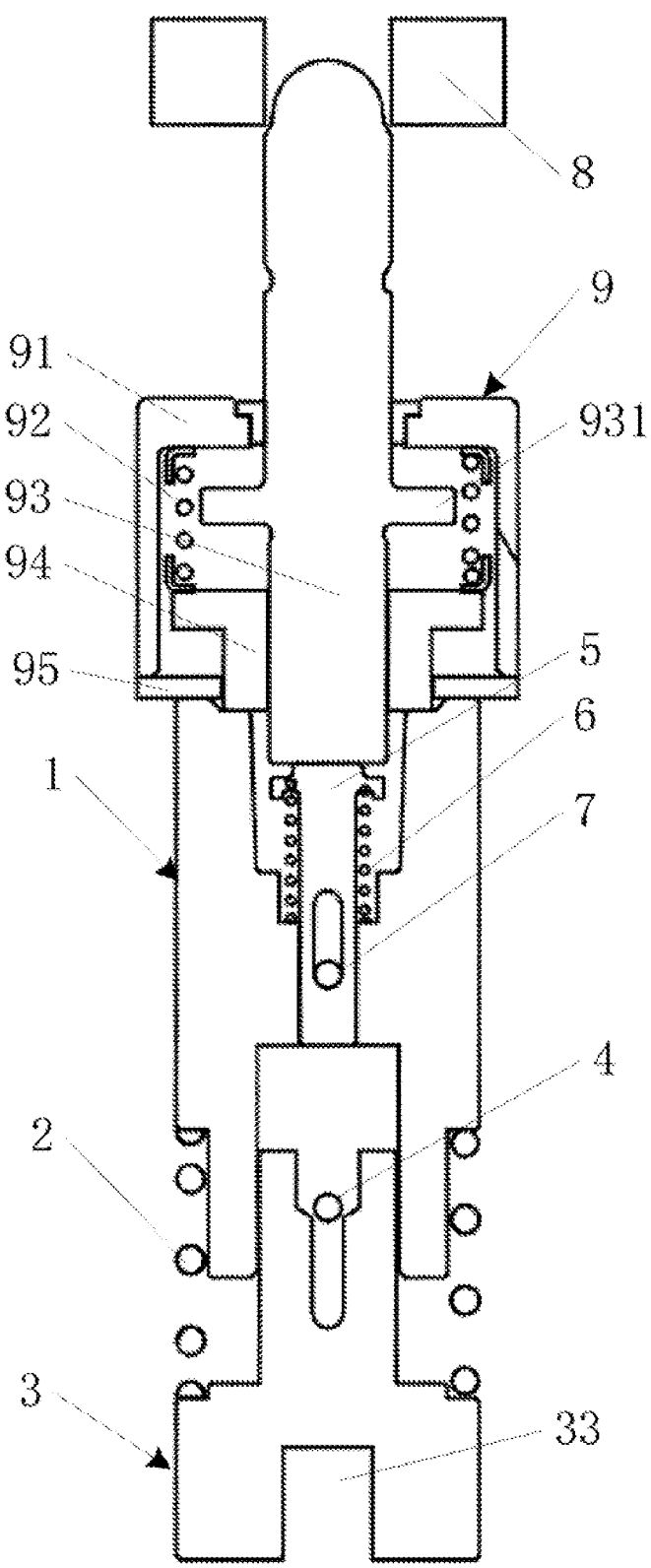
FIG. 6 is a schematic view during a process in which the locking and unlocking fixture capable of adaptive position adjustment of the invention locks the locking device of the power battery.

As shown in FIG. 6, when the power battery is locked by the locking and unlocking fixture, the threaded rod 93 is pushed upwardly by the spring pusher, so that the connecting structure 13 in the fixture sleeve 1 can come into contact with the nut 94. Specifically, the second spring 7 in the spring pusher pushes the push rod 5 upward and further pushes the threaded rod 93 upward such that the connecting structure 13 in the fixture sleeve 1 is successfully connected to the nut 94. In a preferred embodiment of the invention, compared with the push rod 5 directly pushing the threaded rod 93, the push rod 5 pushing the threaded rod 93 by means of the spring force of the second spring 7 can effectively reduce the impact occurring when the threaded rod 93 comes into contact with the locking plate 8.

It will also be understood by those skilled in the art that in the preferred embodiments of the invention, due to the radial clearance fit between the fixture sleeve 1 and the base 3, when the battery swap trolley swaps the power battery, the fixture sleeve 1 and the nut 94 can also be connected and engaged even if a small amount of positional error occurs therebetween, thereby effectively reducing the requirements for the machining and installation precision of the locking and unlocking device for the power battery.

Heretofore, the technical solutions of the invention have been described with reference to the preferred embodiments shown in the accompanying drawings; however, those skilled in the art can readily understand that the scope of protection of the invention is obviously not limited to these particular embodiments. Those skilled in the art can make equivalent changes or substitutions to the related technical features without departing from the principles of the invention, and all the technical solutions after the changes or substitutions will fall within the scope of protection of the invention.

What is claimed is:

1. A locking and unlocking fixture capable of adaptive position adjustment, which is used for locking and unlocking a power battery installed to an electric vehicle, wherein the locking and unlocking fixture comprises:
    a fixture sleeve;
    a base, which is received in the fixture sleeve and is further connected to a driving device, wherein; and
    a first spring sheathed over a portion of the fixture sleeve, wherein the first spring is in contact with the fixture sleeve and the base, such that the fixture sleeve is floatable within a set range relative to the base during a process in which the driving device drives the base to approach the power battery.

2. The locking and unlocking fixture capable of adaptive position adjustment according to claim 1, wherein the base comprises a first columnar segment and a second columnar segment,
    wherein the second columnar segment is a prismatic segment, which is received in a first sliding segment of the fixture sleeve in a clearance fit manner.

3. The locking and unlocking fixture capable of adaptive position adjustment according to claim 2, further comprising a first limiting mechanism, which enables the fixture sleeve to float in a vertical direction relative to the base as the driving device moves the base in the vertical direction and a second limiting mechanism received in a second sliding segment of the fixture sleeve, wherein
    the second limiting mechanism is capable of jacking up a threaded rod of a locking device of the power battery corresponding to the locking and unlocking fixture during a process in which the driving device moves the base in the vertical direction.

4. The locking and unlocking fixture capable of adaptive position adjustment according to claim 3, wherein a top of the fixture sleeve is provided with a connecting structure which is able to match and be butt against the threaded rod of the locking device of the power battery.

5. The locking and unlocking fixture capable of adaptive position adjustment according to claim 3, wherein the second limiting mechanism comprises:
    a push rod, which is received in the second sliding segment, and is slidable in an axial direction of the fixture sleeve;
    a second strip-shaped hole provided in the push rod;
    a second radial hole provided in the second sliding segment; and
    a second connecting rod connected to the second strip-shaped hole and the second radial hole, respectively, wherein the second connecting rod is slidable within a hole length range of the second strip-shaped hole, such that the fixture sleeve is floatable relative to the push rod within the hole length range of the second strip-shaped hole.

6. The locking and unlocking fixture capable of adaptive position adjustment according to claim 2, wherein the first spring is sheathed over the portion of the fixture sleeve corresponding to the first sliding segment, and the first spring is further connected to the first columnar segment, and in a case where an external force is removed, the first spring enables the fixture sleeve to return to an initial position of the fixture sleeve relative to the base.

7. The locking and unlocking fixture capable of adaptive position adjustment according to claim 6, further comprising a first limiting mechanism, which enables the fixture sleeve to float in a vertical direction relative to the base as the driving device moves the base in the vertical direction.

8. The locking and unlocking fixture capable of adaptive position adjustment according to claim 7, wherein the first limiting mechanism comprises:
    a first strip-shaped hole provided in the prismatic segment;
    a first radial hole provided in the first sliding segment; and
    a first connecting rod connected to the first strip-shaped hole and the first radial hole, respectively, wherein the first connecting rod is slidable within a hole length range of the first strip-shaped hole, such that the fixture sleeve is floatable relative to the base within the hole length range of the first strip-shaped hole.

9. The locking and unlocking fixture capable of adaptive position adjustment according to claim 8, further comprising a second limiting mechanism received in a second sliding segment of the fixture sleeve, wherein
    the second limiting mechanism is capable of jacking up a threaded rod of a locking device of the power battery corresponding to the locking and unlocking fixture during a process in which the driving device moves the base in the vertical direction.

10. The locking and unlocking fixture capable of adaptive position adjustment according to claim 7, further comprising a second limiting mechanism received in a second sliding segment of the fixture sleeve, wherein
    the second limiting mechanism is capable of jacking up a threaded rod of a locking device of the power battery corresponding to the locking and unlocking fixture during a process in which the driving device moves the base in the vertical direction.

11. The locking and unlocking fixture capable of adaptive position adjustment according to claim 10, wherein a top of the fixture sleeve is provided with a connecting structure which is able to match and be butt against the threaded rod of the locking device of the power battery.

12. The locking and unlocking fixture capable of adaptive position adjustment according to claim 10, wherein the second limiting mechanism comprises:
- a push rod, which is received in the second sliding segment, and is slidable in an axial direction of the fixture sleeve;
- a second strip-shaped hole provided in the push rod;
- a second radial hole provided in the second sliding segment; and
- a second connecting rod connected to the second strip-shaped hole and the second radial hole, respectively, wherein the second connecting rod is slidable within a hole length range of the second strip-shaped hole, such that the fixture sleeve is floatable relative to the push rod within the hole length range of the second strip-shaped hole.

13. The locking and unlocking fixture capable of adaptive position adjustment according to claim 12, wherein a second spring is sheathed over the push rod, and in a case where an external force is removed, the second spring enables the push rod to return to an initial position relative to the fixture sleeve.

14. The locking and unlocking fixture capable of adaptive position adjustment according to claim 13, wherein the second spring is axially provided between the push rod and the second connecting rod, and
- in the case where an external force is removed, the second connecting rod is able to abut against an end of the second strip-shaped hole that is close to the base.

15. The locking and unlocking fixture capable of adaptive position adjustment according to claim 6, further comprising a first limiting mechanism, which enables the fixture sleeve to float in a vertical direction relative to the base as the driving device moves the base in the vertical direction and a second limiting mechanism received in a second sliding segment of the fixture sleeve, wherein
- the second limiting mechanism is capable of jacking up a threaded rod of a locking device of the power battery corresponding to the locking and unlocking fixture during a process in which the driving device moves the base in the vertical direction.

16. The locking and unlocking fixture capable of adaptive position adjustment according to claim 1, further comprising a second limiting mechanism received in a second sliding segment of the fixture sleeve, wherein
- the second limiting mechanism is capable of jacking up a threaded rod of a locking device of the power battery corresponding to the locking and unlocking fixture during a process in which the driving device moves the base in a vertical direction.

17. The locking and unlocking fixture capable of adaptive position adjustment according to claim 16, wherein a top of the fixture sleeve is provided with a connecting structure which is able to match and be butt against the threaded rod of the locking device of the power battery.

18. The locking and unlocking fixture capable of adaptive position adjustment according to claim 16, wherein the second limiting mechanism comprises:
- a push rod, which is received in the second sliding segment, and is slidable in an axial direction of the fixture sleeve;
- a second strip-shaped hole provided in the push rod;
- a second radial hole provided in the second sliding segment; and
- a second connecting rod connected to the second strip-shaped hole and the second radial hole, respectively, wherein the second connecting rod is slidable within a hole length range of the second strip-shaped hole, such that the fixture sleeve is floatable relative to the push rod within the hole length range of the second strip-shaped hole.

19. The locking and unlocking fixture capable of adaptive position adjustment according to claim 18, wherein a second spring is sheathed over the push rod, and in a case where an external force is removed, the second spring enables the push rod to return to an initial position relative to the fixture sleeve.

20. The locking and unlocking fixture capable of adaptive position adjustment according to claim 19, wherein the second spring is axially provided between the push rod and the second connecting rod, and
- in the case where an external force is removed, the second connecting rod is able to abut against an end of the second strip-shaped hole that is close to the base.

\* \* \* \* \*